C. W. McWANE.
PLOW.
APPLICATION FILED APR. 4, 1917.

1,295,545.

Patented Feb. 25, 1919.
5 SHEETS—SHEET 1.

WITNESSES
Howard D. Orr.
F. T. Chapmean.

INVENTOR,
Charles W. McWane,
BY
E. G. Siggers
ATTORNEY

UNITED STATES PATENT OFFICE.

CHARLES WILLIAM McWANE, OF LYNCHBURG, VIRGINIA.

PLOW.

1,295,545.      Specification of Letters Patent.      Patented Feb. 25, 1919.

Application filed April 4, 1917. Serial No. 159,693.

*To all whom it may concern:*

Be it known that I, CHARLES W. McWANE, a citizen of the United States, residing at Lynchburg, in the county of Campbell and State of Virginia, have invented a new and useful Plow, of which the following is a specification.

This invention has reference to plows, and its object is to provide a construction of plow with the plow point, moldboard and landside separate from and attachable to the plow without the necessity of bolt holes in either the plow point, the moldboard or the landside.

The invention herein claimed is an improvement upon the three patents issued to the Lynchburg Foundry Company, as my assignee, as follows: No. 1,076,440, dated October 21, 1913; No. 1,076,507, dated October 21, 1913; and No. 1,102,067, dated June 30, 1914.

In Patent No. 1,076,440 I have disclosed a plow point which is imperforate, and which is held to the standard by a single bolt carried by the standard, and engaged with a lug formed on the rear face of the plow point.

In Patent No. 1,076,507, I have disclosed a landside which is held in place by a single vertical bolt arranged on the inner side of the standard, the landside being imperforate. I have also disclosed in the patent an imperforate moldboard with a means for holding the same upon the standard of the plow, consisting of three separate connections, the first being an interlocking connection without fastening means; the second, an interlocking connection between a spreader bar and the edge of the moldboard; and the third, a connection between the top of the moldboard and the standard, consisting of a clip held in place by a vertical bolt.

In Patent No. 1,102,067, I have disclosed a handle fastening consisting of an arm extending from the plow standard and constituting a support for one of the handles of the plow, a spreader bar connected with the arm and having its free end bearing against the rear face of the moldboard, and an attaching bar for the other handle secured to the spreader bar.

I have improved upon each of the features embraced in said patents by providing, first, an improved means for fastening the plow point to the standard, dispensing in this instance with a bolt and nut; second, I have improved on the connection of the landside to the standard by dispensing with the vertical bolt before mentioned; third, instead of three connections between the moldboard and the standard for retaining the moldboard in position, I now employ two connections or fastening means; and fourth, the spreader arm or bracket herein disclosed now constitutes a support for one of the securing means for the moldboard, in addition to serving as a brace for the latter.

In accordance with the invention the plow point is provided at separated points with means for interlocking with matching parts on the plow standard in such manner that a simple fastening device, such as a nail, may be used not only to firmly lock the plow point to the standard, but to tighten it thereon in case of loosening. Instead of a nail other fastening means of like function may be employed, but in no instance is it necessary to pierce the plow point for the passage of a bolt, since no bolts are used.

In like manner the moldboard has means at spaced points interlocking with matching parts of the standard, so that no bolt holes are needed through the moldboard. Also, the landside, which is a removable structure separate from either the plow point or the moldboard, has parts interlocking with matching parts on the standard, and the landside may be secured to and tightened on the standard by so simple a device as an ordinary nail.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the following detailed description of the plow expressions of position have reference to the relation of the parts when the plow is upright.

The plow comprises generally a beam 1, which may be a double channel or I beam, having a rear upright portion 2 secured to the inner face of a standard 3 near the rear end of the latter by means of bolts 4, the beam and standard where united being formed to coactively interbrace.

Figure 5:
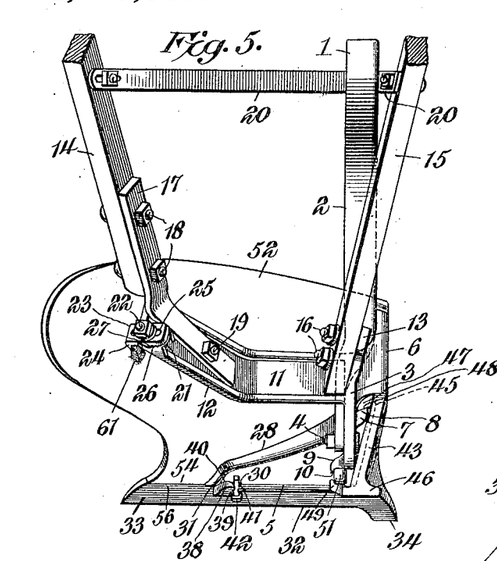
Fig. 5 is a rear view of the plow.
Figure 6:
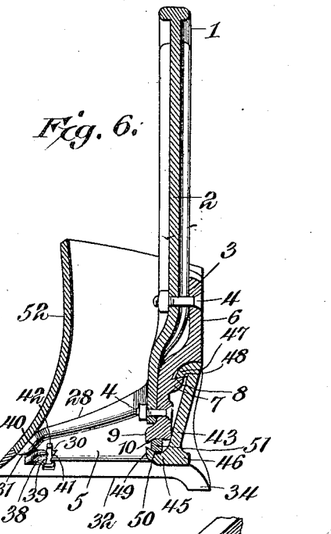
Fig. 6 is a section on the line 6—6 of Fig. 2.
Figure 7:
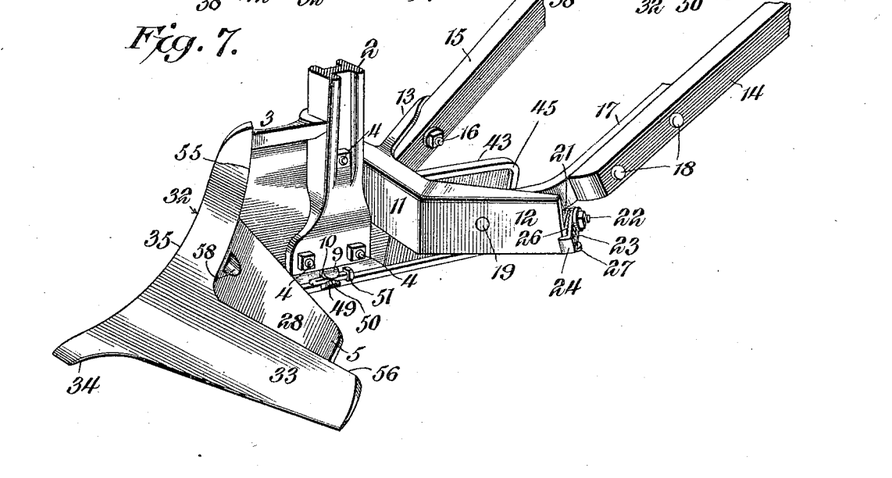
Fig. 7 is a perspective view of the plow with the beam in cross-section and the handles broken away and the moldboard removed.
Figures 8, 9, 10, 11, 12, 13:
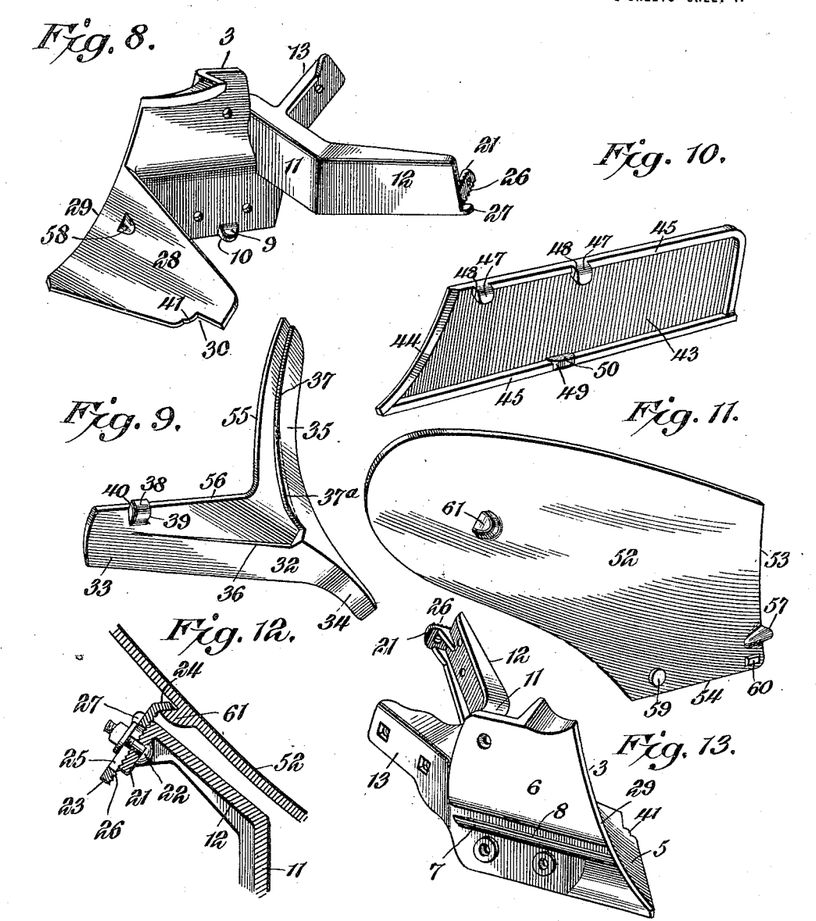
Fig. 8 is a perspective view of the standard with the frog and spreader arm.
Fig. 9 is a perspective view of the plow point as seen from the rear face thereof.
Fig. 10 is a perspective view of the inner face of the landside.
Fig. 11 is a perspective view of the inner face of the moldboard.
Fig. 12 is a detail section showing an arrangement for detachably connecting the moldboard to the standard.
Fig. 13 is a perspective view of the standard as seen from the side opposite to that viewed in Fig. 8.
Figures 14, 15, 16, 17:
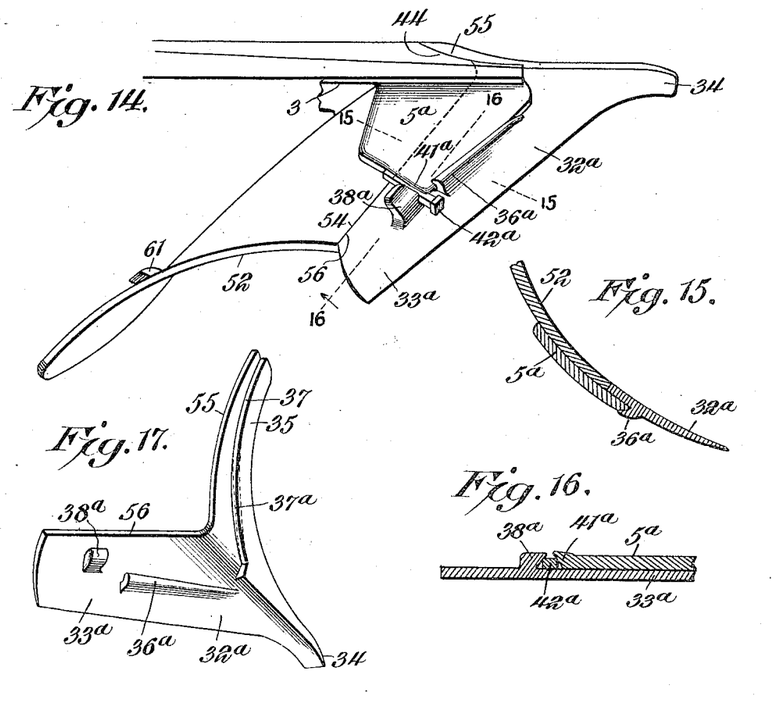
Fig. 14 is a bottom view of a portion of a plow of modified construction.
Fig. 15 is a detail section on the line 15—15 of Fig. 14.
Fig. 16 is a detail section on the line 16—16 of Fig. 14.
Fig. 17 is a rear face view of a modified form of plow point.

Forward of the upright portion 2 of the beam 1 the standard 3 is formed with a frog or foot 5, and has a landside face 6, which along its lower portion is formed with a longitudinal outstanding flange 7 inset with relation to the landside face 6 of the standard, and having its upper edge beveled or slanting to provide an undercut shoulder 8, which shoulder, however, is on the upper surface of the flange 7. (See Figs. 5, 6 and 13.)

Projecting from the inner face of the standard 3 near the bottom edge thereof and near the rear end of the standard is a lug 9 having its under face shaped as a beveled shoulder 10 for a purpose which will hereinafter appear.

Formed on the rear edge of the standard at a distance above the lower edge thereof, and also at some distance below the upper edge thereof, is a transverse spreader arm or bracket 11 terminating at the end remote from the standard in an obtuse-angle continuation 12. Projecting from the bracket 11 in a rearward direction and close to the standard 3 is another arm or continuation 13 which is upwardly inclined. The continuations or arms 12 and 13 carry respective plow handles 14 and 15, the right hand handle 15 being directly connected to the arm 13 by bolts 16, or in other appropriate manner, while the left hand handle 14 is connected to the arm 12 by a strap 17 secured to the handle by bolts 18 and to the continuation 12 by a bolt 19. The parts 11, 12 and 13 are formed integral with the standard. Braces 20 connect the handles 14 and 15 to the beam 1, thereby correspondingly strengthening and stiffening the handle portion of the plow.

The continuation 12 terminates in an angle lip 21 suitably perforated for the passage of a bolt 22, which bolt serves to hold a clip strip 23 to the lip 21. The clip 23 terminates at one end in a short finger 24 for a purpose to be described. The bolt 22 is extended through an elongated slot 25 in the clip and the meeting faces of the clip and lip are roughened or serrated, as shown at 26, so that the clip may be securely held in any adjusted position by the bolt 22 without liability of slipping or twisting. In order to prevent the clip 23 from turning about the bolt 22 when the latter is loosened so that the serrations 26 do not hold the clip, the extremity of the extension 12 is provided with a stop projection 27 on its under side.

Figure 4:
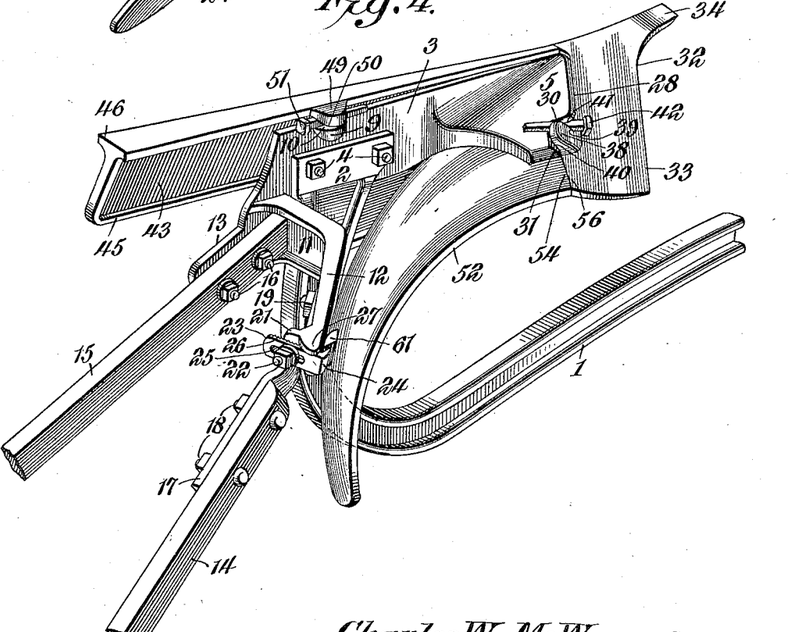
Fig. 4 is an inverted perspective view of the plow as seen at an angle from the rear.

The frog 5 has a concave front face 28 and a curved rising front edge 29, while the end of the frog remote from the standard has a recessed corner portion 30 having the under face where recessed beveled, as indicated at 31. (See Figs. 4, 6 and 8.)

Figure 1:
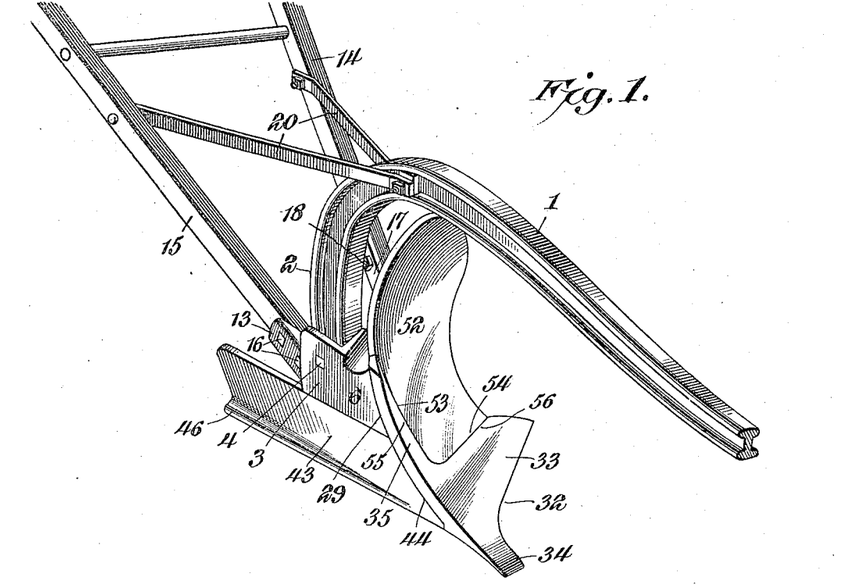
Figure 1 is a perspective view of the assembled plow with portions of the beam and handles cut off.
Figure 2:
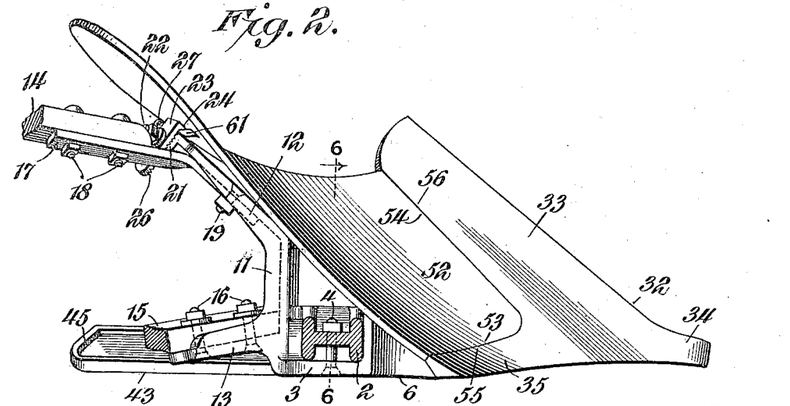
Fig. 2 is a plan view of the structure shown in Fig. 1 with the standard in section and the handles and beam broken off.
Figure 3:
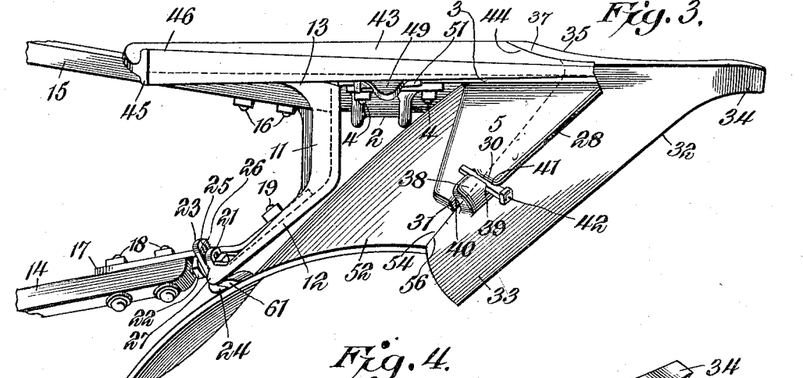
Fig. 3 is an inverted plan view of the plow.

There is also provided a plow point 32, which in the main may be of usual configuration, and comprises a blade or wing 33, nose 34, and shin 35. (See Fig. 9.) On the inner face of the point 32 are angularly related shoulders or abutments 36, 37, one extending along the wing 33 and the other along the shin 35. The abutment 37 has a short overhang portion 37ª midway the upper end of the shin and the upper end of the nose 34. On the blade or wing 33 there is a lug 38 close to that end of the wing remote from the nose 34, and having a beveled or undercut side 39, and also a beveled or undercut shoulder 40 extending at substantially right angles to the side 39. The lug 38 is so positioned on the wing 33 that when the point 32 is in place on the frog or foot 5 the lug 38 will enter the recess 30 in the frog and underride the beveled portion 31 with the overhang 39 immediately adjacent to a shoulder 41 at one side of the recess 30. When the point 32 is in place, the shin 35 extends along the landside portion of the standard with the edge 29 engaging the abutment 37 and entering behind the overhang 37ª. Now by driving a nail 42 between the overhang portion 39 of the lug 38 and the shoulder 41, the abutment 37 with its overhang 37ª is forced tightly against the corresponding portion of the frog and standard and the lug 40 is locked to the frog by the nail 42. (See Figs. 3 and 4.) This is because the matching portions of the lug 38 and shoulder 41 form a receptacle for the nail, while the abutment 36 bears against the corresponding edge of the frog. The point is therefore securely locked at two relatively remote points with the lug 39 effectively preventing any lengthwise or other movement of the point away from the standard and frog, and hence preventing any liability of the point escaping from the plow. Moreover, the nail has a wedging action serving to tighten the point firmly on to the standard and can be readily driven tighter from time to time, if necessary. Any other device beside a nail may be used, especially a device which can be driven in between the lug 38 and the shoulder 41, and if emergency demands, a small piece of hard wood will answer. A nail is advantageous because almost invariably available and easily applied or removed, while a slight bending of the nail after application prevents its accidental escape.

If it becomes necessary to replace a worn out point, this may be done anywhere and with the greatest ease by removing the fastening nail, of which only one is used, whereupon the worn out point may be removed and replaced by a new one, after which the same nail or another one may be inserted, thereby firmly locking the point against accidental displacement, any kind of a tool or even a stone being sufficient for driving the nail.

There is also provided a removable landside in the form of an elongated plate 43 with a front curved edge 44 conforming to the curvature of a portion of the abutment 37 where it is provided with the overhang 37ª. (See Figs. 3 and 10.) The plate 43 has a marginal rib or flange 45 on what constitutes its rear face and another flange 46 along the lower edge on the outer face of the plate. Adjacent to the curved end 44 the landside plate 43 is provided with two lugs 47 spaced apart lengthwise of the plate and projecting from that portion of the flange 45 extending along the upper inner edge of the plate 43. These lugs 47 have their lower faces beveled as shown at 48, the bevel having a downward slant in the installed position of the landside plate 43. Projecting from the inner face of the plate 43 and from the flange 45 along the lower edge of the plate is another lug 49 having its upper surface in the installed position beveled upwardly, as shown at 50. When the landside is applied (see Figs. 4, 5 and 6) the two lugs 47 engage the beveled face 8 of the flange 7, and constituting an interlocking connection between said parts, the plate being moved lengthwise until the edge 44 abuts the overhang 37ª of the plow point. This brings the lug 49 opposite and beneath the lug 9 with their beveled faces or shoulders 10 and 50 approaching, so that by driving a nail 51 or other suitable device between these two lugs they are spread apart one away from the other and the lugs 47 are seated firmly on the flange 7, while the landside plate 43 cannot pull away from or move lengthwise of the standard because it is locked thereto by the nail 51 interposed between the lugs 9 and 49. There is thus provided two connections between the landside and the standard; one an interlocking connection without fastening means; and the other connection which is effected by the insertion of a nail or other driven fastening between the opposing faces of the two lugs.

There is also provided a moldboard 52 which may be in the main of customary construction. The outer face of the moldboard is wholly free from projection, indentation or perforation, that is, the outer or front face of the moldboard is an imperforate, smooth face throughout. (See Fig. 11.) The moldboard has two angularly related edges 53, 54, shaped to engage the meeting edges 55, 56 of the shin 35 and blade 33 of the plow point. On the rear face of the moldboard at the edge 53 near where it merges into the edge 54 there is a lug or tongue 57 suitably positioned to enter a recess 58 in the curved face 28 of the frog 5, and adjacent to the edge 54 the same face of the moldboard is provided with projecting spacing lugs 59, 60. This provides an interlocking connection without fastening means which connection, it will be obvious, is disconnected by the movement of the moldboard laterally and upwardly with reference to the standard.

Projecting from the inner or rear face of the moldboard near the rear end of the latter so as to be engaged by the inner end 24 of the clip 23 when the moldboard is in place (see Fig. 12), is an undercut lug 61 spaced from the lug or tongue 57 by a distance somewhat less than the length of the moldboard. When the moldboard is applied to the standard the tongue 57 is inserted in the recess 58, which is also somewhat undercut to receive it, the lugs 59 and 60 bear against the front face of the frog 5, and the rear face of the moldboard adjacent the lug 61 is backed up by the extension 12 of the arm or bracket 11, said extension bearing against the moldboard. Now, on applying the clip 23 so that the finger 24 engages the undercut portion of the lug 61 and the bolt 22 is tightened, the moldboard is effectively secured in place without liability of loosening, and yet easily removed when desired without the necessity of actually removing any parts from the particular portions of the plow carrying them. The clip means on the spreader arm and lugs 61 on the moldboard constitute the second connection between the moldboard and the standard, which holds the moldboard from becoming disconnected from the first named connection. Still the moldboard is nowhere pierced by a bolt and the only bolt, namely, the bolt 22, which is employed to secure the moldboard in place, does not directly engage the moldboard at all, and, furthermore, may be secured to the extension 12 in a manner permitting it to be loosened or tightened, and yet preventing its loss. The simple expedient of upsetting the threaded end of the bolt 22 so that the nut on the bolt cannot be turned off therefrom will accomplish this purpose. This is the only bolt used in fastening the moldboard, the landside and the plow point in place.

The only fastening means, therefore, which might be lost comprises the two nails 42 and 51, and as such devices can always be found upon a farm where plows are used, the owner of the plow is always enabled to assemble the plow, or after assembling it to tighten the parts, and need not be hampered by the loss of a bolt, which is usually a special form of bolt when employed in a plow, to hold the earth-engaging parts of the plow to the standard.

In the structure shown in Figs. 14 to 17 the standard 3 has a frog or foot 5$^a$ somewhat larger and blunter than the frog 5 of the standard as described with reference to the preceding figures, and has an overhang end forming a shoulder 41$^a$. Instead of the plow point 32 there is provided a plow point 32$^a$ generally similar to the point 32, but having a somewhat wider blade or wing 33$^a$ on which is formed a longitudinally extended overhang rib or abutment 36$^a$ and a lug 38$^a$ similar to the lug 38 of the point 32, but spaced a greater distance from the edge 56 of the wing 33$^a$ than is the case in the point 32. One long edge of the frog 5$^a$ engages under the overhang abutment 36$^a$, while the edge or shoulder 41$^a$ of the frog 5$^a$ is adjacent and in operative relation to the lug 38$^a$, so that a nail 42$^a$ or other suitable device for the purpose may be introduced between the shoulder 41$^a$ and the lug 38$^a$, thus locking the parts together against the possibility of displacement with relation to the frog 5$^a$.

The plow point, the moldboard and the landside are separate castings with the lugs thereon integral therewith and the plow standard is also a casting with such lugs or parts thereon coacting with the removable parts of the plow integral with the standard.

The overhang 37$^a$ of the flange 37 of the plow point and the lug 38 or 38$^a$ of the plow point engage the frog of the standard at spaced points so related that a single fastening device in the form of the nail 42 or 42$^a$ most effectively anchors the plow point to the standard against displacement by any strains to which the point is subjected when in operation.

The moldboard also has two opposed fastening means or connections on its rear face, neither of which appears on the front face or from the front of the moldboard, so that these fastening means are well protected during the operation of the plow and are in no wise subjected to wear. Nor is there any part to be lost or misplaced.

As to the two fastening means or connections for the landside these also are entirely on the rear or back face of the landside and are so related and so spaced that a single fastening device in the form of a nail effectively locks the landside in place against liability of displacement when in use.

What is claimed is:—

1. In a plow, a standard having a frog with a shoulder near one end on its rear face, and a plow point having angularly related shin and blade portions with respective elongated abutments on the rear face in angular relation, with the abutment on the shin provided with an overhang portion near the base end of the shin to engage about the front edge of the frog where joining the standard, and the blade of the point being provided with a lug on its rear face in position to coöperate with the shoulder on the frog for the application of a wedging device therebetween.

2. In a plow, a standard having a frog with a shoulder near one end on its rear face, and a plow point having angularly related shin and blade portions with respective elongated abutments on the rear face in angular relation, with the abutment on the shin provided with an overhang portion near the base end of the shin to engage about the front edge of the frog where joining the standard, and the blade of the point being provided with a lug on its rear face in position to coöperate with the shoulder on the frog for the application of a wedging device therebetween, the abutment on the blade portion of the point merging into the rear face of the blade near the lug thereon.

3. In a plow, a plow point having angularly divergent shin and blade portions each with an abutment or shoulder thereon and angularly related one to the other, the shoulder or abutment on the shin having an overhanging portion on the part thereof nearest to the blade, and the blade portion being provided with a lug projecting from its rear face.

4. In a plow, a plow point having angularly divergent shin and blade portions with the shin portion having a longitudinally disposed shoulder or abutment provided with an overhang at the end toward the blade, and the blade being provided with a longitudinally disposed shoulder or abutment, and a lug on its rear face adjacent to the free end of the blade and projecting therefrom in overhanging relation thereto, said lug also having an overhang on the side toward the shin.

5. In a plow, a plow point provided with an abutment and a lug both projecting from the rear face of the plow point and spaced from each other, with the lug overhanging toward the abutment, and a standard having a frog to engage the abutment and a shoulder to coöperate with the lug, whereby a single wedge member engaging the lug and shoulder will serve to lock the plow point on the plow.

6. In a plow, a plow point provided with an abutment and a lug both projecting from the rear face of the plow point and spaced from each other, with the lug overhanging toward the abutment, and a standard having a frog to engage the abutment and a shoulder to coöperate with the lug, whereby a single wedge member engaging the lug and shoulder will serve to lock the plow point on the plow, said lug also overhanging in a direction substantially at right angles to the first-named overhang of the lug.

7. In a plow, a plow point having angularly related shin and blade portions with each provided with a longitudinally disposed shoulder or abutment, the shoulder on the shin, having an overhang portion directed toward and adjacent to the blade, and the blade having a longitudinally disposed shoulder or abutment merging into the blade toward the free end of the latter, and said blade having a lug or projection on the same face as the abutment with the lug overhanging one edge of the blade and also having an overhang directed toward the abutment of the blade.

8. In a plow, a plow point provided with angularly related shin and blade portions, with the shin portion provided on its rear face with a longitudinally disposed shoulder or abutment having an overhang at the end toward the blade and directed thereto ward, and said blade having an overhang shoulder or abutment extending lengthwise thereof, and a lug on the same face of the blade and nearer to the free end of the latter than the shoulder on the blades, said lug being shaped to receive a wedge-like fastening member.

9. In a plow, a standard having a frog provided with a recess at one end forming a shoulder, and a plow point having a lug on its rear face adapted to be fitted in said recess, said lug being arranged to overhang the edge of the frog and being spaced from said shoulder for the application of a driven fastener therebetween to hold the plow point to the standard.

10. In a plow, a standard having a frog provided with a shoulder at one end, and a plow point having a lug on its rear face, which when the plow point is applied to the frog is spaced from the shoulder of the latter, said lug and shoulder having matching portions forming a receptacle for the application of a driven fastening member to lock the plow point in place.

11. In a plow, the standard having a frog provided with a shoulder at one end, and a plow point provided with a longitudinal abutment to engage the edge of that portion of the frog which overlaps the point, and a lug on the point spaced from the end of the abutment and also spaced from the shoulder on the frog, said lug and shoulder having matching portions so that a driven fastening member may be applied thereto for locking the point in place.

12. In a plow, a moldboard provided at one forward edge with an overhang lug and remote from the rear edge provided with an overhang lug, the overhanging portions of the lugs being substantially opposite one to the other and both located on the rear face of the moldboard.

13. In a plow, a standard having a frog with an undercut recess therein and a spacer member with a supporting bracket thereon, and a moldboard with a lug adapted to the recess and another lug near the end of the moldboard on the rear face thereof, the bracket being provided with a clip for engaging the second-named lug on the moldboard and with fastening means for holding the clip in position on the bracket, the lug having an angle finger for engaging the clip with the lug having an overhanging portion where engaged by the clip, and said clip and bracket being roughened or serrated where engaging.

14. In a plow, a standard provided with a frog having an undercut recess therein, and a spreader provided at the end remote from the standard with a bracket extension, and a moldboard having on its rear face near its front edge an overhang lug for engagement in the undercut recess in the frog, and also on its rear face another lug remote from the rear end of the moldboard with said lug having an overhang portion on the side of the lug remote from the first-named lug, and a clip on the bracket on the spreader in position to engage the overhang portion of the second-named lug on the moldboard with said clip provided with means for securing it to the bracket.

15. A plow including a standard provided at the rear with a transverse spreader arm terminating at the end remote from the standard in an obtuse angle continuation, a moldboard mounted upon the standard and having its rear face bearing against said continuation, and means carried by said continuation for rigidly securing the moldboard thereto.

16. A plow including a standard, provided at the rear with a transverse spreader arm terminating at the end remote from the standard in an obtuse angle continuation, a moldboard mounted upon the standard and having its rear face bearing against said continuation, and means carried by said continuation for securing the moldboard thereto, said means comprising a lug projecting from the rear face of the moldboard, and a clamp carried by said fastening and engaging said lug.

17. A plow including a standard provided at the rear with a transverse spreader arm, a moldboard mounted upon the standard, a lug provided on the rear face of the moldboard, and securing means carried by said arm and engaging said lug.

18. A plow including a standard provided at the rear with a transverse spreader arm, a moldboard mounted upon the standard, and means carried by said spreader arm for securing the moldboard thereto, said means comprising a lug projecting from the rear face of the moldboard remote from the edges thereof, and an adjustable clip carried by the spreader arm and engaging said lug.

19. A plow including a standard provided at the rear with a transverse spreader arm, a moldboard mounted upon the standard, and means carried by said spreader arm for securing the moldboard thereto, said means comprising an undercut lug projecting from the rear face of the moldboard, and a clip carried by the spreader arm and terminating in a finger which engages the undercut portion of said lug.

20. A plow including a standard provided at the rear with a transverse spreader arm, a moldboard mounted upon the standard, and means carried by said spreader arm for securing the moldboard thereto, said means comprising a lip on the end of the spreader arm, a clip having a finger at one end, a bolt and nut connecting the lip and clip for adjusting the same, and a lug projecting from the rear face of the moldboard to be engaged by said finger.

21. In a plow, the combination of a standard, an imperforate moldboard, a connection between the moldboard and the standard, said connection being an interlocking connection without fastening means, which connection is disconnected by a lateral movement of the moldboard, and a second connection between the moldboard and the standard, said second connection being provided between the rear face of the moldboard and the rear portion of the standard, and remote from the edges of said moldboard, and above the plane of the first-named connection.

22. In a plow, the combination with a standard, an imperforate moldboard, a connection between the moldboard and the standard consisting of a lug on the moldboard and a recess in the standard, said lug and recess interfitting, and a second connection between the moldboard and the standard, said second connection being provided between the rear face of the moldboard and the rear portion of the standard, and remote from the edges of the said moldboard and above the plane of the first-named connection.

23. In a plow, the combination with a standard, an imperforate moldboard, a connection between the standard and that edge of the moldboard which is nearest to the landside, said connection being an interlocking connection without fastening means, which connection is disconnected by a lateral movement of the moldboard, and a second connection between the moldboard and the standard, said second connection being located nearer to the opposite edge of the moldboard than the first-named connection and above the plane of the same.

24. In a plow, the combination of a standard, an imperforate moldboard, a connection between the moldboard and the standard at that edge of the moldboard which is nearest to the landside, said connection being an interlocking connection without fastening means, which connection is disconnected by a lateral movement of the moldboard, and a second connection between the moldboard and the standard for the purpose of resisting such lateral movement, said second connection being located nearer to the opposite edge of the moldboard than the first-named connection and above the plane of the same, and said second connection being remote from the edges of the moldboard and at the rear face of the latter.

25. In a plow, the combination of a standard, an imperforate moldboard, a connection between the moldboard and the standard, consisting of a lug on the rear face of the moldboard at that edge which is nearest the landside, and a recess in the contiguous portion of the standard to receive said lug, and a second connection consisting of a lug on the rear face of the moldboard remote from the first-named lug, and also remote from the edges of the moldboard, and an engaging means at the rear of the standard to connect with the second-named lug and hold the moldboard in position.

26. In a plow, a plow standard having a landside with a longitudinal rib having its upper face beveled and said standard at its lower edge and on the face remote from the landside being provided with an undercut lug projecting therefrom, and a landside plate with undercut lugs along the upper edge to engage the beveled portion of the flange and another undercut lug on its lower edge to match the undercut lug on the standard, the undercut portions of the lug on the standard and the second-named lug on the plate having their undercut portions oppositely directed to receive a wedge-like fastening member between them.

27. In a plow, a standard having a longitudinally disposed flange on the landside with a beveled upper surface and a lug on its lower edge on the side remote from the landside, and a landside member for attachment to the standard and provided with lugs for engaging the beveled edge of the flange and matching the lug on the lower edge of the standard, the last-named lugs being coactively shaped to receive a fastening member between them to lock them together.

28. In a plow, the standard having on its inner face an undercut lug, a landside having its upper edge interlocked with the standard and provided at its lower edge with an undercut lug to match the said lug on the standard, the undercut portions of the two lugs being oppositely disposed to receive a wedgelike fastening between them.

29. In a plow, the standard having on its landside face an inwardly projecting lug at the bottom, an imperforate landside having an inwardly projecting lug at the bottom to match the lug on the standard, said lugs being constructed to be locked by the insertion of a driven fastening member between them, and a separate interlocking connection between the landside and the standard, whereby the landside is held in place without the use of bolts and nuts.

30. In a plow, the standard having on its landside face a longitudinally disposed flange, and an inwardly disposed lug at the bottom, a landside having means for interlocking with said flange, and a lug on the bottom of the landside to match with the lug on the standard, said lugs being constructed to be locked by the insertion of a wedgelike fastening between them.

31. In a plow, a standard having on its landside face a lug, an imperforate landside also having a lug to match with the lug on the standard, an interlocking connection between the landside and the standard, said lugs being coactively arranged to receive and be locked by the insertion of a driven fastening member.

32. In a plow, a standard, a landside, an interlocking connection between the landside and the standard, and a second connection between said standard and said landside, said second connection being effected by the insertion of a driven fastening member.

33. In a plow, a standard, a landside, an interlocking connection between the standard and the landside at the upper edge thereof, and a second connection between said standard and said landside, said second connection being located at the inner side of the landside and at the bottom, and being formed of coacting elements which are locked by the insertion of a separate driven member.

34. A plow including a standard provided at the rear with a transverse spreader bracket terminating at the end remote from the standard in an obtuse angle continuation, an upwardly extending inclined arm projecting rearwardly from the bracket near the point where the latter merges with the standard and adapted to receive the right hand plow handle, said bracket, the angle continuation and arm being formed integral with the standard, and a strap secured to the left hand plow handle and also secured to said continuation, whereby the handles are maintained in spread apart relation.

In testimony, that I claim the foregoing as my own, I have hereto affixed my signature in the presence of two witnesses.

CHARLES WILLIAM McWANE.

Witnesses:
F. B. DAVIS,
S. G. HARRISS.

Copies of this patent may be obtained for five cents each, by addressing the "Commissioner of Patents, Washington, D. C."